(12) United States Patent
Dan et al.

(10) Patent No.: US 12,277,307 B2
(45) Date of Patent: Apr. 15, 2025

(54) IN-PAGE NAVIGATION

(71) Applicant: Taboola.com Ltd, Ramat Gan (IL)

(72) Inventors: Adi Dan, Tel Aviv (IL); Ido Azriel, Kiryat Ono (IL); Meytal Doanis, Petach Tikva (IL); Lior Papirblat, Hod Hasharon (IL)

(73) Assignee: TABOOLA.COM LTD., Ramat Gan (IL)

( * ) Notice: Subject to any disclaimer, the term of this patent is extended or adjusted under 35 U.S.C. 154(b) by 150 days.

(21) Appl. No.: 18/132,759

(22) Filed: Apr. 10, 2023

(65) Prior Publication Data

US 2023/0244366 A1 Aug. 3, 2023

Related U.S. Application Data

(62) Division of application No. 17/590,564, filed on Feb. 1, 2022.

(60) Provisional application No. 63/144,659, filed on Feb. 2, 2021.

(51) Int. Cl.
*G06F 3/04842* (2022.01)
*G06F 3/0481* (2022.01)
*G06F 3/0485* (2022.01)
*G06F 16/955* (2019.01)
*G06F 16/957* (2019.01)

(52) U.S. Cl.
CPC ........ *G06F 3/04842* (2013.01); *G06F 3/0481* (2013.01); *G06F 3/0485* (2013.01); *G06F 16/9577* (2019.01); *G06F 16/9558* (2019.01)

(58) Field of Classification Search
None
See application file for complete search history.

(56) References Cited

U.S. PATENT DOCUMENTS

| | | | | |
|---|---|---|---|---|
| 8,543,715 | B1 * | 9/2013 | Rabbat | G06F 16/972 709/224 |
| 10,083,322 | B2 * | 9/2018 | Denner | H04L 67/306 |
| 10,104,172 | B1 | 10/2018 | Demsey | |
| 2005/0289147 | A1 | 12/2005 | Kahn et al. | |
| 2011/0055314 | A1 * | 3/2011 | Rosenstein | G06F 16/957 715/846 |
| 2011/0055683 | A1 * | 3/2011 | Jiang | G06F 16/957 709/219 |

(Continued)

OTHER PUBLICATIONS

The extended European search report issued by the European Patent Office for European Patent Application No. 22154766.4, dated Jun. 27, 2022.

(Continued)

*Primary Examiner* — Linda Huynh
(74) *Attorney, Agent, or Firm* — Myers Wolin, LLC

(57) ABSTRACT

A method, system, and product comprising: obtaining a user instruction instructing the browser to navigate to a second page, wherein the browser is displaying a first page, wherein the first page comprises a link to a second page, wherein the link is configured to instruct the browser to navigate to the second page, wherein the user instruction is based on a selection of the link; preventing the browser from navigating to the second page in response to the user instruction; and causing the browser to present content from the second page in an element that is placed over the first page.

20 Claims, 4 Drawing Sheets

(56) References Cited

U.S. PATENT DOCUMENTS

| | | | |
|---|---|---|---|
| 2012/0254892 A1* | 10/2012 | Grabowski | G06F 3/038 |
| | | | 719/318 |
| 2014/0143644 A1* | 5/2014 | Smedberg | G06F 16/00 |
| | | | 715/240 |
| 2014/0181730 A1* | 6/2014 | Briand | G06F 3/04883 |
| | | | 715/784 |
| 2015/0242376 A1 | 8/2015 | Parikh et al. | |
| 2016/0103798 A1* | 4/2016 | Greenberg | G06F 3/0485 |
| | | | 715/738 |
| 2016/0103804 A1* | 4/2016 | Greenberg | G06F 16/40 |
| | | | 715/234 |
| 2016/0179951 A1* | 6/2016 | Burkard | G06F 16/285 |
| | | | 707/706 |
| 2016/0239171 A1* | 8/2016 | Anai | G06F 40/143 |
| 2018/0375931 A1* | 12/2018 | Demsey | H04L 67/1091 |
| 2019/0230186 A1* | 7/2019 | Yellin | H04L 67/5681 |
| 2021/0326930 A1* | 10/2021 | Tran | G06F 3/0485 |

OTHER PUBLICATIONS

Holst, Christian, "4 Design Patterns That Violate "Back" Button Expectations—59% of Sites Get It Wrong", Baymard Institute, Jul. 20, 2020, pp. 1-28, Retrieved from the Internet: URL:https://web.archive.org/web/20201204205516/https://baymard.com/blog/back-button-expectations (retrieved Jun. 17, 2022).

* cited by examiner

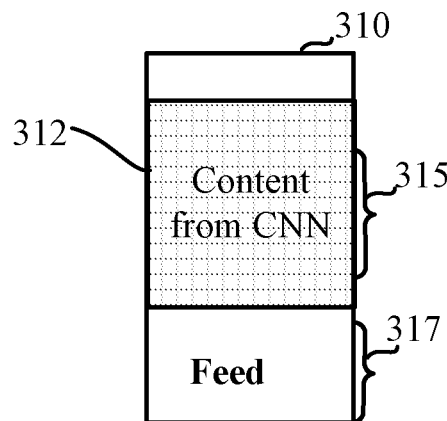
FIG. 3A
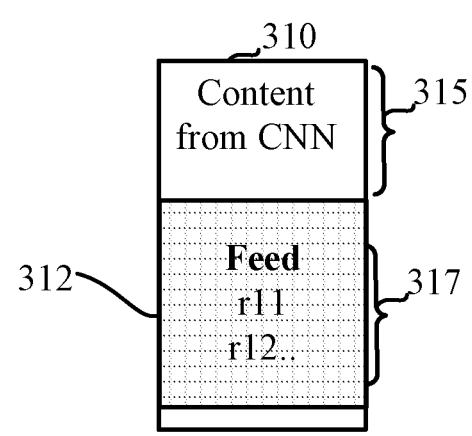
FIG. 3B
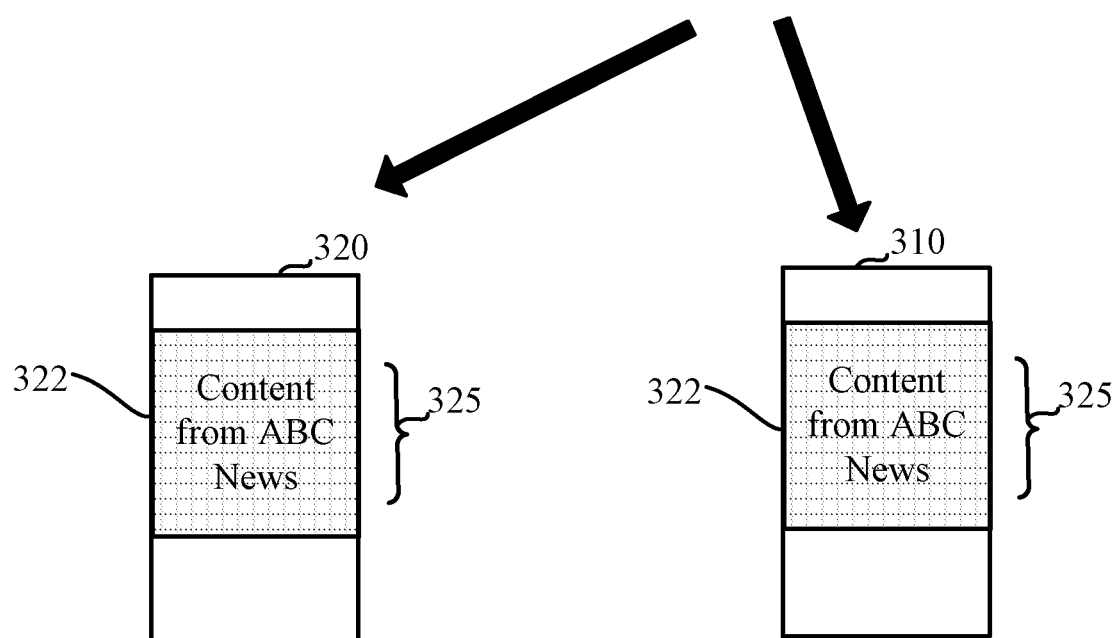
FIG. 3C
FIG. 3D

IN-PAGE NAVIGATION

CROSS-REFERENCE TO RELATED APPLICATION

This application is a divisional of U.S. patent Ser. No. 17/590,564, filed Feb. 1, 2022, which claims the benefit of Provisional Patent Application No. 63/144,659, titled "Overriding Page Navigation Functionalities Of A Browser", filed Feb. 2, 2021, which is hereby incorporated by reference in its entirety without giving rise to disavowment.

TECHNICAL FIELD

The present disclosure relates to content rendering in a browser, in general, and to providing in-page navigation functionality, in particular.

BACKGROUND

Digital content is usually sent from a content source or server, to be consumed in a client or another machine or location. A browser (e.g., a web browser) is a software application that comprises numerous software components, which process digital content of various types (normally including information resources identified by uniform resource identifier or locator), together with a set of internal (i.e. defined locally by the browser) and external (i.e. defined by entities other than the browser such as the content source, the operating system, the host device, etc.) directives and constraints, and eventually decides how content should be laid out and displayed on a display device of a certain host computer, under the specific circumstances.

BRIEF SUMMARY

One exemplary embodiment of the disclosed subject matter is a browsable page retained in a non-transitory computer readable medium, wherein the browsable page comprising instructions for a browser executed on a computer device, wherein the browsable page comprising: a first page providing content to be displayed to a user, wherein the first page comprises a dynamically-loaded feed element, wherein the dynamically-loaded feed element is configured to dynamically load a set of content cards to be displayed in the dynamically-loaded feed element, wherein the dynamically-loaded feed element is configured to load additional content cards in response to scrolling events, wherein the set of content cards are associated with links to pages, wherein the set of content cards comprise a card that comprises a link to a second page; wherein the browsable page is configured to cause the browser to, in response to a click on the card, present content from the second page in an element that is placed over the first page, thereby preventing the user from seeing any portion of the first page, whereby providing a user experience of navigating away from the first page to the second page; and wherein the browsable page is configured to cause the browser to, after presenting the content from the second page and in response to a back instruction to the browser, cause the element not to be displayed, thereby providing a user experience of returning to the first page without reloading the first page.

Optionally, the browsable page is configured to cause the browser, in response to the back instruction, to dynamically modify the first page by adding a content card to the dynamically-loaded feed element; adding a visual guide element that is configured to assist the user in orienting in the first page, or the like.

Optionally, the browsable page is configured to: estimate, prior to the click on the card, that the user will click on the card; prior to the click on the card and based on the estimation that the user will click on the card, load the content from the second page in the element in an invisible manner, wherein the second page is loaded in advance; and wherein the content from the second page is presented by causing the element to become visible.

Another exemplary embodiment of the disclosed subject matter is a method comprising: displaying a content of a first page to a user, wherein the first page comprises a dynamically-loaded feed element, wherein the dynamically-loaded feed element is configured to dynamically load a set of content cards to be displayed in the dynamically-loaded feed element, wherein the dynamically-loaded feed element is configured to load additional content cards in response to scrolling events, wherein the set of content cards are associated with links to pages, wherein the set of content cards comprise a card that comprises a link to a second page; in response to a click by the user on the card, presenting content from the second page in an element that is placed over the first page, thereby preventing the user from seeing any portion of the first page, whereby providing a user experience of navigating away from the first page to the second page; and after presenting the content from the second page and in response to a back instruction by the user, causing the element to not be displayed, thereby providing a user experience of returning to the first page without reloading the first page.

One exemplary embodiment of the disclosed subject matter is a method comprising: obtaining a user instruction instructing the browser to navigate to a second page, wherein the browser is displaying a first page, wherein the first page comprises a link to a second page, wherein the link is configured to instruct the browser to navigate to the second page, wherein the user instruction is based on a selection of the link; preventing the browser from navigating to the second page in response to the user instruction; and causing the browser to present content from the second page in an element that is placed over the first page.

Optionally, in response to a second user instruction instructing the browser to navigate back to the first page, the method is configured to cause the element not to be displayed, thereby providing a user experience of returning to the first page without reloading the first page.

Optionally, the element is an inline frame (iframe) element, and a container element, wherein said causing the browser to present the content comprises: causing the browser to present the content in the element being displayed, as an overlay over the first page.

Optionally, preventing the browser from navigating to the second page comprises: monitoring events of the first page; capturing an event of interest, wherein the event of interest comprises an event indicating the selection of the link; and stopping a propagation of the event of interest from reaching a navigation module of the browser.

Optionally, preventing the browser from navigating to the second page comprises: updating the first page to modify a behavior of the browser in response to the user instruction, wherein said updating comprises including an instruction in the first page that is configured to cause the browser to present the content from the second page in the element, whereby performing said causing the browser in response to the user instruction.

Optionally, the first page does not define the element, and the method comprises instructing the browser to add to the element to the first page.

Optionally, the element is added to the first page by a server-side manipulation of the first page, whereby the element is added to the first page before the first page is served to the browser.

Optionally, the element blocks a view of the first page completely, thereby providing to the user a display of the content from the second page that is identical to a display of navigating to the second page by the browser.

Optionally, the method comprises modifying, in response to said causing the browser, an address bar of the browser to indicate an address of the second page, whereby providing a user experience of browsing to the second page without navigating to the second page.

Optionally, the method comprises, in response to a second user instruction instructing the browser to navigate back to the first page from the second page, selecting between: reloading the first page by the browser; and causing the element to not be displayed, whereby avoiding reloading the first page.

Optionally, said selecting is performed based on an elapsed timeframe between a time of the user instruction and a time of the second user instruction.

Optionally, the method comprises, in response to said obtaining, generating an analytics event and sending the analytics event to an analytics entity, wherein the analytics event indicates that the user visited the second page, whereby enabling a correct server-side analysis of user activity consuming content of the first page and the second page.

Optionally, the method comprises modifying a history log of the browser, by adding to the history log an indication of the second page.

Optionally, the first page is a dynamic page comprising a dynamic element that receives updates after the first page is loaded, whereby returning to the first page is not configured to provide an identical display of the first page as was displayed prior to navigating away from the first page.

Optionally, the dynamic element is a dynamically-loaded feed element configured to be dynamically loaded with additional elements in response to user interaction with the browser.

Another exemplary embodiment of the disclosed subject matter is an apparatus comprising a processor and coupled memory, said processor being adapted to: obtain a user instruction instructing the browser to navigate to a second page, wherein the browser is displaying a first page, wherein the first page comprises a link to a second page, wherein the link is configured to instruct the browser to navigate to the second page, wherein the user instruction is based on a selection of the link; prevent the browser from navigating to the second page in response to the user instruction; and cause the browser to present content from the second page in an element that is placed over the first page.

Yet another exemplary embodiment of the disclosed subject matter is a computer program product comprising a non-transitory computer readable medium retaining program instructions, which program instructions when read by a processor, cause the processor to: obtain a user instruction instructing the browser to navigate to a second page, wherein the browser is displaying a first page, wherein the first page comprises a link to a second page, wherein the link is configured to instruct the browser to navigate to the second page, wherein the user instruction is based on a selection of the link; prevent the browser from navigating to the second page in response to the user instruction; and cause the browser to present content from the second page in an element that is placed over the first page.

Yet another exemplary embodiment of the disclosed subject matter is a system comprising a processor and coupled memory, said processor being adapted to: obtain a user instruction instructing the browser to navigate to a second page, wherein the browser is displaying a first page, wherein the first page comprises a link to a second page, wherein the link is configured to instruct the browser to navigate to the second page, wherein the user instruction is based on a selection of the link; prevent the browser from navigating to the second page in response to the user instruction; and cause the browser to present content from the second page in an element that is placed over the first page.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 3A-3D illustrate exemplary scenarios, in accordance with some exemplary embodiments of the disclosed subject matter.

DETAILED DESCRIPTION

Figure 1:
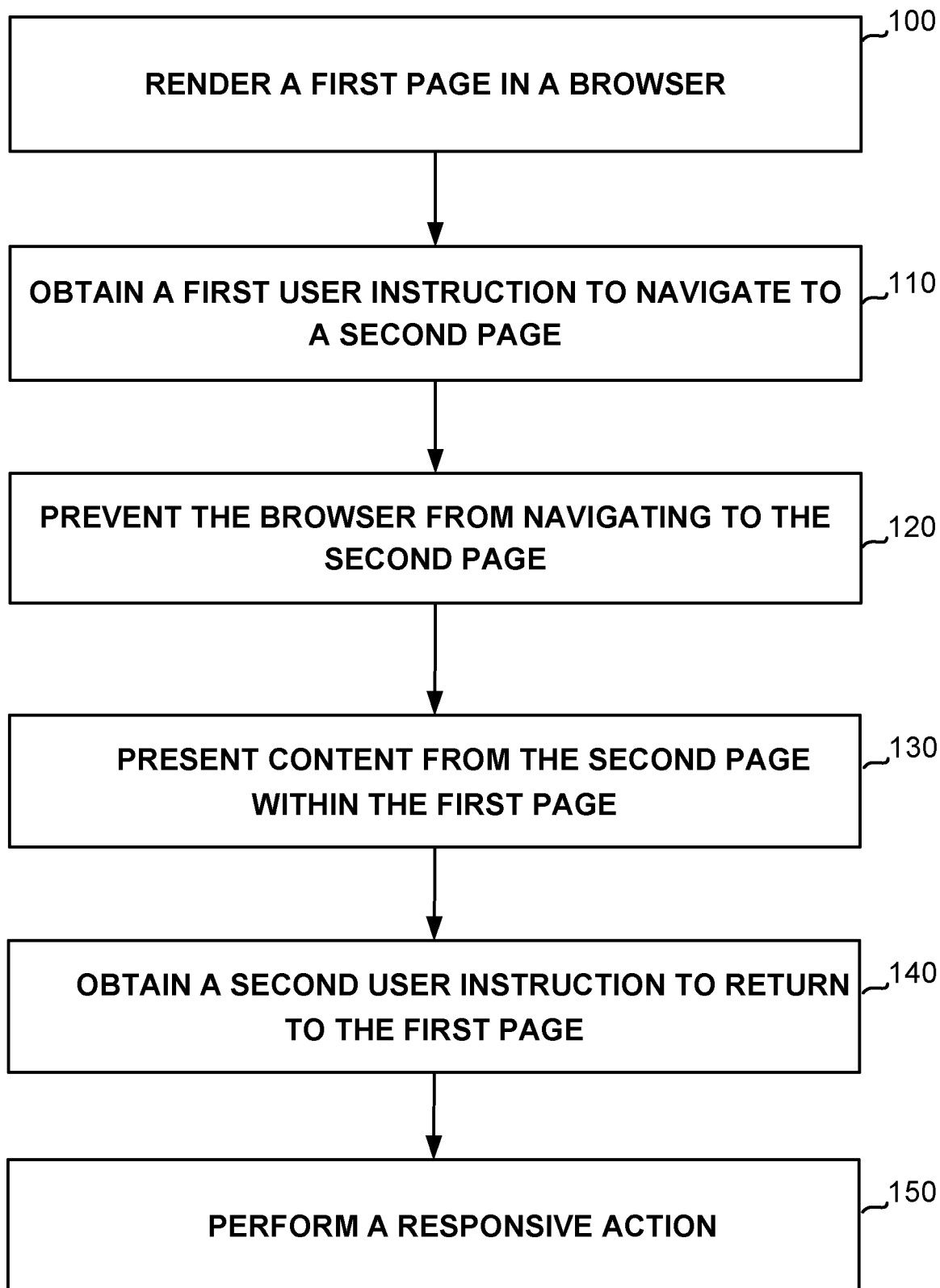
FIG. 1 shows an exemplary flowchart diagram of a method, in accordance with some exemplary embodiments of the disclosed subject matter.

One technical problem dealt with by the disclosed subject matter is enhancing a User eXperience (UX) of a user consuming content via a browser. In some exemplary embodiments, publishing entities using one or more Internet domain names may own and serve digital content. In some exemplary embodiments, content may refer to text, audio, video, code, styling, formatting, data dumps, a combination thereof, or the like.

In some exemplary embodiments, browsers of end devices may obtain digital content and render the content in a user display. In some exemplary embodiments, a browser may comprise a software that runs on an end device and provides one or more browsing functionalities thereto. In some exemplary embodiments, the browser may handle content and code from multiple entities, e.g., publishers, advertising entities, content servers, or the like. In some exemplary embodiments, the content may be displayed for users in layouts referred to as "pages", thereby browsing "pages" of content. In some exemplary embodiments, navigation functionalities of the browser may be defined with respect to pages; for example, navigation may be performed only between pages, a history log or "back" events may relate to pages; counting by third-party analytics services may be based on a count of page views, or the like. In some cases, a "back" event may refer to a user instruction that instructs the browser to revert back to one or more previously displayed pages.

In some exemplary embodiments, at each moment, a certain portion of a loaded page may be displayed to the user. This portion may be referred to herein as the "display" of the page. In some exemplary embodiments, the display may alter upon scrolling up or down a page, zooming in or out, or the like, as different content portions of the same page are shown. In some exemplary embodiments, the display may alter upon altering the page, e.g., by navigating to a different page. In some exemplary embodiments, the display may alter upon injecting or generating elements in the page, such as in response to client-side code being invoked.

In some exemplary embodiments, a browser may be responsible for receiving or loading content from publishing entities, advertising entities, or the like. In some exemplary embodiments, a browser may be responsible for maintaining data such as cookies for certain domains, enforcing limitations such as data security restrictions that prevent domains from obtaining passwords or cookies from other domains, or the like. In some exemplary embodiments, the browser may be responsible for responding to user interactions, instructions, generated events, or the like. For example, the browser may report data indicating when a user has performed certain actions, enable a user to scroll up and down to view displays of the page, update a display of a page by loading one or more feeds or content portions, navigate between pages by loading new pages or enabling the user to revert back to previously displayed pages. In some exemplary embodiments, a browser may be responsible for sending event data to servers for analytics purposes, e.g., in order to update a view count of a page, to obtain statistical information of a page, or for any other purpose. It is noted that in some cases, view count and other statistical information may be utilized in computing reward and monetization of the page, such as based on amount of clicks on advertisements, impressions of advertisements, or the like. Additionally, or alternatively, such information may be utilized to improve content delivery for the user or other users, such as ad serving, suggested content serving, or the like.

In some exemplary embodiments, a browser may render and display a first page comprising one or more linked items or containers, which may be linked to one or more respective second pages. For example, upon rendering and displaying a content item of an original publisher, the browser may render and display one or more additional contents or media portion such as advertising content items. In some cases, the browser may present to a user of an end device a "feed" including one or more cards associated with content, recommendations, or the like. In some cases, the feed may or may not comprise an infinite feed element that is configured to be dynamically loaded with additional elements in response to user interaction with the browser. In some exemplary embodiments, the feed may comprise cards that are linked to content belonging to one or more domains of one or more publishers, such as the original publisher that provides the main content, third party publishers, or a combination thereof. In some exemplary embodiments, each card in the feed may be associated to content of a same domain of the original publisher or to content of a different domain. In some exemplary embodiments, organic transferring may refer to rendering content that belongs to the original publisher, while non-organic (or sponsored) transferring may refer to rendering content that belongs to a different publisher. In other cases, any other items or objects in the first page may be linked to respective second pages.

For example, a publisher may be the New York Times™, which may have a content item, e.g., an article of the New York Times™. The article may be rendered at a browser of an end device. In some exemplary embodiments, the browser may render a feed of recommendation cards or content cards in addition to the article of the New York Times™, e.g., below comments to the article, in parallel to the article, or in any other page location relative to the article. In some exemplary embodiments, the feed may include cards associated or linked to the New York Times™ domain or to one or more alternative domains, e.g., the CNN™ domain.

In some exemplary embodiments, in case the user is interested in viewing target content, such as content associated with a recommendation card of the feed, the user may select or click on the linked card, or on any other linked items, thereby triggering organic or non-organic transferring. For example, in case the card that is selected includes a card of a different domain, e.g., the CNN™ domain, a non-organic transferring may occur. In case the card that was selected includes a card of a same domain, e.g., the New York Times™ domain, a subsidiary thereof, or an otherwise associated domain, an organic transferring may occur. It is noted that when an organic or non-organic transferring occurs, a new second page (also referred to as "target page" or "landing page") may be loaded by the browser, in the same tab of the browser, in a different tab, or the like, instead of the first page or in addition thereto.

In some exemplary embodiments, a user may attempt to return back to the feed of the first page (also referred to as "source page" or "original page"), such as in case she regrets clicking on the card item, in case she finished consuming content of the second page, in case she has an intent to consume content associated with a different card item from the feed of the first page, or the like. For example, the user may wish to return to a same display of the first page's feed prior to selecting the card. In some exemplary embodiments, in order to return to the feed, the user may press on a "back" button or perform any other action or command that is configured to navigate back to the feed of the first page. In some exemplary embodiments, the browser may regard this attempt as a request to load the entire New York Times™ article of the first page again, which may utilize unnecessary resources of memory and computations, instead of merely retaining the first page that was previously presented. Additionally, or alternatively, dynamically loaded content may be different when re-loading the first page. For example, advertisements may be served dynamically, and in the second load, a different set of advertisements may be shown. As another example, the feed element may not be in the same state as it was when the user browsed to the target page. The state may be different because the number of cards that are loaded is different, because the content of the cards and their order may be different, or the like. Other client-side-code-based functionalities, such as collapsing/expanding elements and lists, navigating within map widgets, or the like, may also cause the re-loaded page to be different. Additionally, or alternatively, when the first page is reloaded, the scrolled location therein may be different than the location that the user was at when she first navigated away from the first page. Additionally, the browser's launching of a second page as a new page may cause incorrect network analytics, at least since analytics service may count the browsing of the first page twice as two separate or unassociated visits of the page, instead of a single page visit by the same user.

Another technical problem dealt with by the disclosed subject matter is eliminating the above drawbacks and refraining from utilizing unnecessary resources, in the form of loading a same page twice in response to a "back" event.

Yet another technical problem dealt with by the disclosed subject matter is preventing the browser from reporting a wrong number of page visits in response to a "back" event.

Yet another technical problem dealt with by the disclosed subject matter is to enable a user that navigated from a first page to a second page, to return seamlessly to a previous display of the first page, without perceiving a noisy or jumpy UX. In some exemplary embodiments, in case the browser loads the first page a second time, the user may be returned to a new displayed location, such as the top of the first page, that is not a same display that was presented to her when selecting the link, e.g., the same location in the feed below the New York Times™ article. This may be inconvenient for the user, as she might need to manually scroll down all the way to the previous location of the first page in order to continue browsing from the same display of the first page from which she left, and since the feed may have changed since the previous rendering of the first page. Additionally, loading the first page a second time may be time consuming, further reducing the user's UX. In some exemplary embodiments, even in case a code embedded in the browser initiates an automatic scroll down to the previous display of the first page, the display may jump down non-smoothly, providing a jumpy and low-quality user experience, and the feed may be modified to remove a card that was of interest to the user.

One technical solution provided by the disclosed subject matter is overriding one or more browser functionalities. In some exemplary embodiments, the browser may be prevented from opening a new page in response to a user clicking on a link in a first page (such as a source page in which a feed including linked cards is located). In some exemplary embodiments, the browser's functionality upon obtaining a user selection of a link to a second page (e.g., embedded in a card from a feed) may be overridden, and content from the second page may be rendered within the first page. In some exemplary embodiments, an element that enables to render content from the second page may be generated, inserted, placed, or the like, within the first page. For example, an inline frame (iframe) element may be placed in the first page, and the second page or content thereof (e.g., target content associated with the card) may be rendered in the iframe element. As another example, a container element may be placed in the first page, and the second page or content thereof may be rendered in the container element. In other cases, any other method may be used to render content from the second page within the first page.

In some cases, the element that is used to render content from the second page within the first page may be referred to as the 'element' or 'iframe', although it may comprise non-iframe elements such as a container. The usage of iframe herein is done for clarification purposes and in a non-limiting manner. Other technologies may be utilized to achieve a similar user experience effect. Such technologies include, for example, Hypertext Markup Language (HTML) tags like <embed>, the usage of other libraries or specific standards that are supported by the browser, dynamic manipulation of the Document Object Model (DOM) of the page, or the like.

In some exemplary embodiments, the target content of the second page may comprise content that is configured to be presented to a user upon clicking or selecting a link of a recommendation card, or any other linked item or element that is linked to the second page. For example, a feed card may include media or text that relate to a title of an article, and upon clicking on the card, the target content, including the article itself, an associated feed, or the like, may be rendered and presented in the element. In some exemplary embodiments, iframe and container elements may be used to embed another document within a current HTML page. In some exemplary embodiments, a functionality of the iframe, the container, or the like, may be supported by various browsers including CHROME™, FIREFOX™, INTERNET EXPLORER/EDGE™, SAFARI™, OPERA™, or the like. In some exemplary embodiments, from the point of view of the browser, after rendering content from the second page in the element, the first page that is presented to the user has not changed in response to the user pressing on the recommendation card, since the element may be presented within the first page.

In some exemplary embodiments, certain aspects of the currently disclosed subject matter may be implemented by a software agent that may be embedded in pages of a website, a mobile application, a desktop application, or the like. In some exemplary embodiments, the software agent may be associated to the pages in any other way. For example, the software agent may be executed over the page via a browser extension. In some cases, the agent may be deployed by a feed generator that generates the feed of cards, or by any other entity. For example, the agent may comprise JavaScript code embedded in one or more HTML pages of a website rendered by a browser. In some exemplary embodiments, the agent may monitor or capture events of the page in which it is embedded, DOM changes of the page, or the like. In some exemplary embodiments, upon capturing events of interest, such as events associated with page navigation functionalities, an event of clicking on a recommendation card of a feed, attempting to return back from the recommendation card to the feed, or the like, the agent may capture the event, e.g., without providing the event to the browser, and instruct the browser to perform one or more alternative responses to the events.

For example, upon identifying that a user pressed on a card of a feed, the agent may override the browser's functionality that is configured to open a new page, and instead generate an iframe over the display of the first page, therewithin, and render the card's target content, e.g., publisher content linked to the card, in the iframe. In some exemplary embodiments, the iframe may be displayed on the entire window or screen of the user, hiding the display of the original first page, without having a noticeable different User Interface (UI) than a UI of navigating to a new page. According to this scenario, the display of the iframe may not enable the user to perceive that the iframe is not a new page. Alternatively, the display of the iframe may have one or more differences from a display of a new page, e.g., the iframe may be displayed in a smaller window showing portions of the first page, with a different style, with the original URL of the first page, or the like.

It is noted that in some cases, the overriding of the functionality of the browser may be performed in advance, such as by including in the page code that is configured to avoid browsing to a different page and instead loading the content into the element.

In some exemplary embodiments, the agent may instruct to perform one or more replacement operations instead of browsing operations that are configured to be performed only upon navigating to a new page. For example, the agent may modify the browser's address bar, which shows a URL or address associated with the first page, to instead present the URL or address associated with the second page, although the browser has not navigated to the second page, and from the point of view of the browser, the first page is rendered. In some exemplary embodiments, the history log of pages visited by the user in the browser may be updated by the agent to simulate a browser's visit to the second page, e.g., although the browser has not navigated to the second page. In some cases, such as in case the user navigates within the element to additional pages, the navigation functionality of the elements may be similarly overridden by the agent, and replacement operations may be performed for each such navigation.

In some exemplary embodiments, after the target content of the second page is rendered at least partially in the iframe, the user may wish, in some cases, to return to the previous display of the first page. In some exemplary embodiments, in case a "back" event is invoked by a user, e.g., by clicking on a back button of the browser, sending a vocal command, or the like, via selecting the link from the history mechanism of the browser, the agent may capture the "back" event and handle the event independently, without obtaining instructions or communications from a remote server. In some exemplary embodiments, in response to a user pressing the "back" button or functionality, the agent may instruct the browser to close the iframe, terminate its display, or the like, leaving the user at the exact same display or page location in the first page. In some cases, in order to preserve the display, the agent may further instruct the browser to avoid refreshing the first page.

In some cases, in response to the "back" event, the agent may invoke one or more alternative functionalities, operations, or the like, such as refreshing the first page, preventing the browser from refreshing the first page, reporting data to a server, or the like. For example, in case that a non-continuous experience is identified, such as in case the user consumed the card's target content for a long period of time that overpasses a continuity threshold, the iframe may be terminated and the first page may be instructed to be refreshed, since the user may have forgotten of her previous displayed portion in the first page due to time passing, and may no longer expect to be returned to the same display area in the first page. As another example, in case that a continuous experience is identified, such as in case the user consumed the card's target content for a short period of time that is lesser than a continuity threshold, the iframe may be terminated and/or the first page may be instructed not to be refreshed, since the user may expect to be returned to the same display area in the first page.

One technical effect of utilizing the disclosed subject matter may be reducing a resource utilization by preventing an original first page to be loaded twice, e.g., in response to a "back" event. In some exemplary embodiments, loading the first page or resources associated with it only once may cause the browser to generate less resource requests requesting the first page to be obtained, may cause less analytics reports to be invoked from the end device, may reduce a load on content servers, or the like.

Another technical effect of utilizing the disclosed subject matter is enhancing a UX of navigating back from a second page to a first page, such as by providing a smooth and non jumpy return to the first page and enabling to maintain the exact display of the first page.

Yet another technical effect of utilizing the disclosed subject matter is enhancing a UX of utilizing a feed of a first page, by providing a smooth and non jumpy return from a rendered card's linked content to the display of the first page, without enabling the feed to be modified. In some exemplary embodiments, since the iframe is generated on top of the first page, without navigating to the second page, the user may be returned to the exact same display location from which it was referred, without requiring the user to wait for the first page to load again its resources, without requiring the user to manually scroll down to the previous display, without requiring the user to wait for the page to automatically "jump" down in a non-smooth manner, or the like. Using iframes may provide a more attentive UX that relates to the user's perceived display and experience, instead of relating to the browser's page definitions.

It is noted that experiments conducted by the Applicant showed an increase of over 10% in user engagement with a feed element in cases where the user has engaged the feed element, and that such user engagements are intentional and of high quality. These experimental results show that the disclosed subject matter improves significantly UX as the user can continue her engagement after returning to the feed element from a previously visited page.

Yet another technical effect of utilizing the disclosed subject matter is enhancing a Clickthrough rate (CTR) and Revenue Per Mille (RPM) of publishers associated with the feed, since users may be returned smoothly to feed for consuming more content, and since the analytics services may be more accurate (e.g., by not counting twice or more the first page visit).

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 illustrating a flowchart diagram of a method, in accordance with some exemplary embodiments of the disclosed subject matter.

On Step 100, a first page with one or more content elements may be rendered in a browser. For example, the first page may comprise an article element, a feed element, or the like. In some exemplary embodiments, the first page may comprise a link to a second page. For example, a recommendation card in the feed of the page may comprise a link to the second page, in which content associated to the recommendation card may be presented. In other cases, any other link in any other element may connect the first and second pages. For example, the first page may comprise a search result page with linked results. In some exemplary embodiments, selection of the link between the first and second pages may be configured to invoke an event that instructs the browser to navigate to the second page. As another example, the first page may comprise an infinite feed element, showing various content cards, whose content is associated with different pages. In response to a user clicking a content card, the browser may be instructed to display the page with which the content card is associated. The page may be in the same domain, or in a different domain; obtained from the same web server, or from a different web server; or the like.

On Step 110, a first user instruction instructing the browser to navigate to the second page, may be obtained. In some exemplary embodiments, the user instruction may comprise a selection of the link, e.g., by the user. For example, the link may be selected by clicking on the link, using vocal commands instructing to select the link, pressing on the link, hovering above the link, double clicking the link, or the like.

In some exemplary embodiments, the user instruction may cause a generation of an event indicating that the browser should navigate to the second page. In some exemplary embodiments, the user instruction and/or the event may be identified, detected, monitored, or the like, at a software agent embedded within the first page, a software agent executed over the first page, or the like. For example, the agent may comprise a JavaScript code embedded in the first page that may be executed by the browser.

On Step 120, the browser may be prevented from navigating to the second page. For example, the agent may prevent the browser from navigating to the second page by monitoring events of the first page, capturing an event of interest such as an event indicating the selection of the link, and stopping a propagation of the event of interest from reaching a navigation module of the browser. In some cases, the agent may prevent from the selection event to reach the browser. In some cases, the agent may instruct the browser not to navigate to the second page, regardless of whether the selection event reaches the browser's navigation module.

In some cases, the prevention may be performed in advance. For example, the page may be modified to remove a command to browse the second page. In some cases, instead of a command to the browser to navigate to the second page, a client-side code may be invoked that is configured to perform the functionality of Step 130. Additionally, or alternatively, the page may originally be defined so as to not cause navigation event, but rather to invoke a different in-page activity that does not cause the browser to navigate to a different page. It is noted that such a functionality may be conceptually considered as preventing the browser from navigating to the second page.

On Step 130, the agent may cause the browser to present content from the second page in an element that is placed over the first page. In some exemplary embodiments, the element may comprise an iframe element, a container element, or any other element that enables to display content from the second page within the first page. In some exemplary embodiments, the agent may cause the browser to present the content in the element being displayed, as an overlay over the first page. For example, the agent may instruct the browser to generate an iframe element in the first page, and to render a content of the second page within the iframe element. In some exemplary embodiments, the content of the second page may be presented in the element by loading the second page in the element, by injecting features of the second page in the element, by imitating a content and design of the second page, or the like.

In some exemplary embodiments, the element may comprise an element that enables to display content from the second page within the first page. For example, the element may comprise an iframe element that is displayed over the first page's display. As another example, the element may comprise a container that is presented over the first page's display. According to this scenario, one or more HTML tags may define a container for rendering an external resource, such as by using an embed HTML element (<embed>tag), an object HTML element (<object>tag), a frame HTML element (<frame>tag), or the like. As another example, HTML frames ('framesets') may be used to divide a browser display or window into multiple sections, where each section can load a separate HTML document.

As another example, instead of displaying an element over the first page's display, the display itself may be modified such as by changing the styling, format, and content of the first page to match the second page. According to this scenario, the content of the second page may be injected into the first page, page representations may be modified, or the like. For example, this scenario may be advantageous in case the browser supports a bulk layout or a bulk rendering of a display in the background. In some cases, for browsers that do not support bulk layout or bulk rendering capabilities, instead of using an element, the generation of the target content may comprise steps of rendering partial displays, until a complete or partial display is obtained.

In some exemplary embodiments, the element may be added to the first page in by the browser or by a server that provides the page. Additionally, or alternatively, a developer may include the element in the page. In some exemplary embodiments, the first page may not originally define the element, and the browser may be instructed to generate the element, to launch the element, to add to the element to the first page, or the like. For example, the agent may instruct the browser to generate the element and add the generated element to the first page. In some exemplary embodiments, the element may be added to the first page by a server-side manipulation of the first page, which may add the element to the first page before the first page is served to the browser. For example, the element may be added by a server that provides the first page to the browser, by a server that provides the first page to another server until eventually reaching the browser, or the like. In some cases, the element may be generated and added to the first page manually, such as in response to a user instruction from a user viewing the first page.

In some exemplary embodiments, the element may comprise an overlay that is presented above the first page, e.g., hiding at least a portion of a display thereof. In some exemplary embodiments, the element may be configured to block a view of the first page completely, thereby providing to the user a display of the content from the second page that is identical to a display of navigating to the second page by the browser. For example, the entire display of the first page may present a container or iframe with target content. In some exemplary embodiments, the element may be configured to block a partial view of the first page, thereby providing to the user a display of the content from the second page that is different from a display of navigating to the second page by the browser. For example, a window within the first page may present a container or iframe with target content, thereby enabling the user to perceive a portion of the original display as well at least a portion of the content from the second page. As another example, the window within the first page may block all the actual content of the first page but still include a title bar of the internal window, which may display the title of the second page, may include a close button (e.g., "X") enabling the user to close the internal window, or the like. In some exemplary embodiments, the element may block the view of the location that was interacted with in the first page. For example, a content card in a feed element may be clicked. In response to such an interaction, the element may be displayed over the first page, blocking from view at least the clicked content card. In some cases, other portions of the first page may remain visible, such as other content cards, or elements external to the feed element.

In some cases, prior to obtaining the first user instruction that instructs the browser to navigate to the second page, the agent may estimate whether or not the user will instruct the browser to navigate from the first page to the second page. For example, the agent may estimate whether the user will prefer a first card, associated with the second page, over a second card, associated with a third page. In some exemplary embodiments, in case the agent estimates that the user will instruct the browser to navigate to the second page, or that a probability thereof overpasses a threshold, the agent may render the second page in the element invisibly, e.g., prior to obtaining the user instruction. For example, the agent may instruct the browser to generate the element, and render the second page therein invisibly, such as while the element has a "hidden" attribute, while the element is set up behind the displayed portion of the first page, or the like. In some exemplary embodiments, in response to obtaining the user instruction, instructing the browser to navigate to the second page, the agent may cause the browser to cause the element to become visible, thereby saving loading time of content from the second page, and enhancing a user experience. The browser may cause the element to be visible, such as by moving the element from the background to the foreground, by updating the "hidden" attribute to be false, or the like.

On Step 140, a second user instruction may be obtained from the user. In some exemplary embodiments, the second user instruction may be configured to instruct the browser to return to a previous page, e.g., the first page, such as by selecting a 'back' button, providing a 'back' vocal command, or the like. In some exemplary embodiments, the agent may monitor the second user instruction, and prevent the browser from implementing the second user instruction.

On Step 150, a responsive action may be performed by the agent. In some exemplary embodiments, in response to the second user instruction instructing the browser to navigate back to the first page, the agent may cause the element not to be displayed, such as by terminating the instance of the element, causing the element to become invisible, setting the "hidden" attribute of the element to true, changing settings of the element, closing the element, or the like, thereby providing a user experience of returning to the first page without reloading the first page.

In some exemplary embodiments, in response to the second user instruction, the agent may select between reloading the first page by the browser and between causing the element to not be displayed, whereby avoiding reloading the first page. In some exemplary embodiments, the agent may estimate an intention of the user with regard to the intended display of the first page, and instruct the browser to block a refreshing operation or to perform a refreshing operation based on the estimated intention. For example, based on an elapsed timeframe between a time of the first user instruction, instructing the browser to navigate to the second page, and a time of the second user instruction, instructing to return to the first page, an intention of the user may be determined. For example, in case the elapsed timeframe indicates that the user intends to return to a previous display of the first page, e.g., in case the elapsed timeframe is below a threshold, the agent may select to close the element without reloading the first page, or may instruct the browser to block a refreshing of the first page. As another example, based on the elapsed timeframe indicating that the user does not intend to return to the exact previous display of the first page, e.g., in case the elapsed timeframe is greater than a threshold, the agent may select to reload the first page.

In one scenario, the first page may comprise a dynamic page comprising a dynamic element (e.g., a feed) that receives updates after the first page is loaded, whereby returning to the first page is not configured to provide an identical display of the first page as was displayed prior to navigating away from the first page. For example, the dynamic element may comprise an infinite feed element that is configured to be dynamically loaded with additional elements in response to user interaction with the browser. It is noted that the term "infinite feed element" herein is not restrictive to feed elements that are capable of loading an infinite number of elements therein, and refers to any dynamically-loaded feed element. In some cases, the infinite feed element may be restricted by the number of elements it is capable to load, such as based on an existing finite content repository from which the elements are selected, based on a predetermined configuration (e.g., restricting the feed to load up to 30 elements), or the like.

The feed may be configured to change based on real time user interactions with content of the second page. For example, in case the user selects a recommendation card that is associated with a first category, e.g., sports, the feed may be adjusted to comprise feeds that are associated with sports, or with categories that are popular with a cluster of user profiles that are interested in sports. In some cases, upon loading the content of the second page within the element, and receiving a user instruction to return from the second page to the first page, the element may be closed, without reloading the first page, this enabling the user to return to the previous display of the feed without any feed changes, or with changes indicating the consumed feed content including consumed content in the iframe.

In some exemplary embodiments, the agent may invoke one or more events, e.g., instead of the browser's default behavior when navigating to a new page. In some exemplary embodiments, since the iframe is not identified at the browser as a new page, the browser may not include the iframe's content in its page count events, thereby causing inaccurate counting of page visits at analytics servers. In some exemplary embodiments, the agent may override one or more functionalities of the browser, and cause the browser to suppress default behavior such as to postpone an auto-refresh of the first page, to suppress analytics events sent from the browser, to force the browser to reload the first page, or the like.

In some exemplary embodiments, in order to provide a user experience of browsing to the second page as a page, without actually navigating to the second page, the agent may replace one or more of the suppressed functionalities of the browser. For example, the agent may modify an address bar of the browser to indicate an address of the second page, although the second page was not loaded by the browser as a separate page. As another example, a history log of the browser may be modified by the agent to correspond to the default behavior of the browser when navigating to the second page, e.g., by adding to the history log an indication of the second page. As another example, in response to obtaining a user instruction to navigate to the second page, an analytics event may be generated, and the analytics event may be sent to an analytics entity, e.g., independently of the browser. In some exemplary embodiments, upon rendering content of the second page into an iframe, the agent may invoke an independent event configured to indicate that content of the second page was visited. In some exemplary embodiments, the analytics event may indicate that the user visited the second page, thereby enabling a correct server-side analysis of user activity consuming content of the first page and the second page. For example, the agent may send an update report directly to an analytics entity, e.g., to Google Analytics™, indirectly, or the like.

Figure 2:
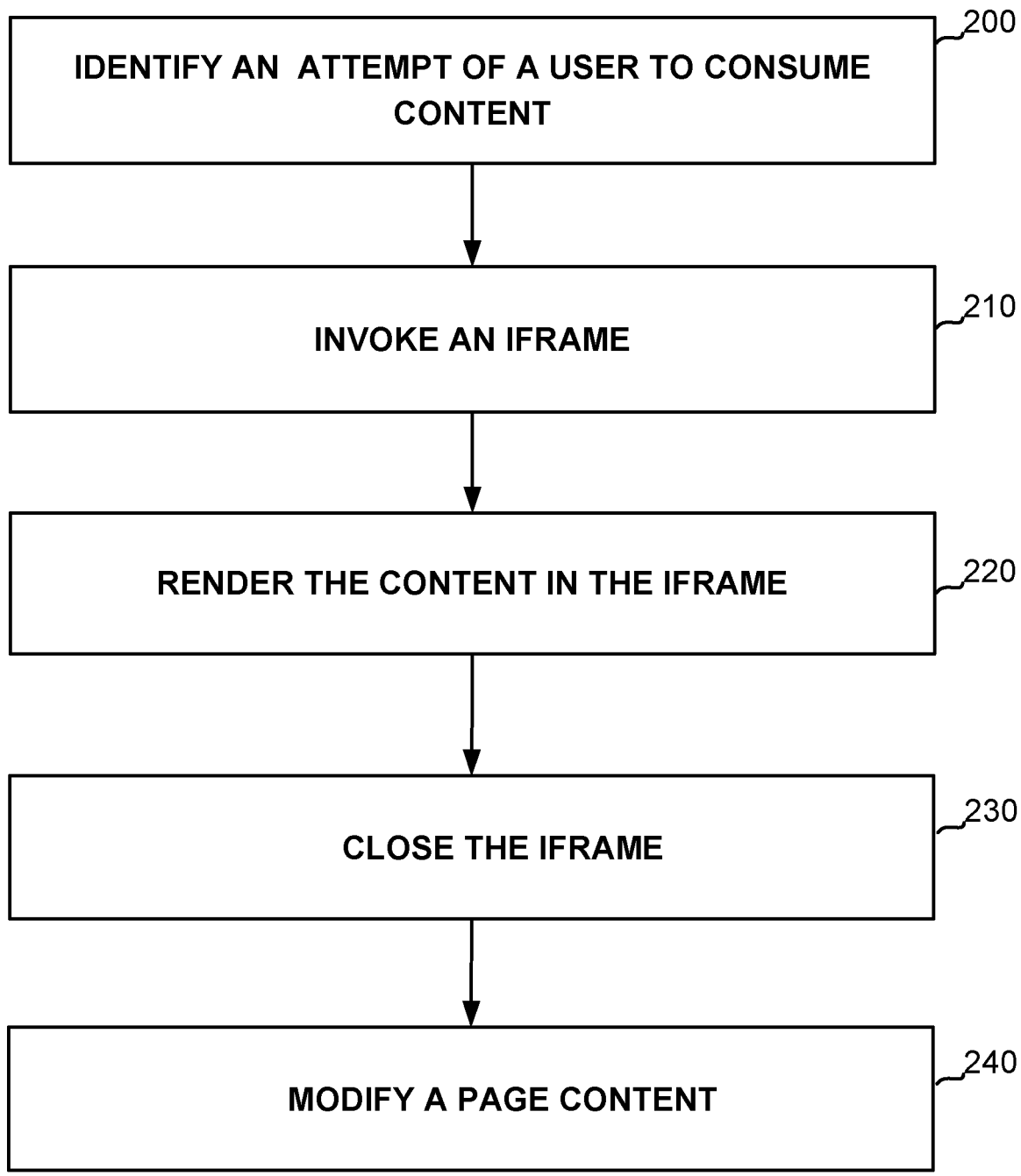
FIG. 2 shows an exemplary flowchart diagram of a method, in accordance with some exemplary embodiments of the disclosed subject matter.

Referring now to FIG. 2 illustrating a flowchart diagram of an exemplary method, in accordance with some exemplary embodiments of the disclosed subject matter. In some exemplary embodiments, an exemplary scenario, in which the first page comprises a feed element with recommendation cards, may be implemented according to Steps 200-230.

On Step 200, an attempt of a user to consume content associated with a recommendation card of a feed of a first page may be identified. In some exemplary embodiments, the attempt may be identified at an agent embedded within the first page, executed thereover, or the like. In some exemplary embodiments, the attempt may include an event of clicking on the recommendation card or otherwise selecting the recommendation card.

On Step 210, an element such as an iframe element may be invoked, generated, presented, or the like, e.g., by the agent. In some exemplary embodiments, the agent may capture the event of selecting the recommendation card, and, in response, display an iframe element over a display of the first page. In some exemplary embodiments, the entire browsing of the feed and its associated content may be performed on the first page, e.g., by launching a new iframe (or any other element) over the first page each time a recommendation card in the feed is selected by the user. In some exemplary embodiments, in order to capture selection events within the iframe element, such as when navigating within the iframe, JavaScript code may be embedded in the iframe element, in the first page, or the like, enabling to override the navigation functionality of the iframe.

In some exemplary embodiments, upon capturing the selection event, the agent may determine whether or not content associated with the recommendation card is enabled to be rendered in an iframe, and in case content is not enabled to be rendered in an iframe, the agent may release the event so that it is provided to the browser, without generating an iframe. In such a case, the method may be terminated without performing Steps 210-230. In some exemplary embodiments, in case content is enabled to be rendered in an iframe, the agent may perform Steps 210-230. It is noted, however, that in some embodiments, the functionality may be hard-coded within the page itself. For example, a browsable page may include the content of the first page as well as the feed element and iframe element. The feed element may be defined with instructions to cause the loading of linked pages within the iframe element.

On Step 220, content associated with the recommendation card may be rendered in the iframe. In some exemplary embodiments, upon capturing the event of clicking on the recommendation card, the agent may obtain and render content linked to the recommendation card into the iframe. In some exemplary embodiments, the iframe may enable the user to browse content associated with further recommendation cards or any other content, e.g., enabling internal scrolling, internal navigation, or the like.

In some exemplary embodiments, rendering target content associated with a clicked card may comprise obtaining the target content from a target publisher of the pressed card and rendering the content in an iframe. In some exemplary embodiments, in case of organic transferring, in which the target publisher is the same publisher as the publisher of the first page, the browser may enable content rendering from the publisher into the iframe. For example, this may occur in case the first page belongs to the New York Times™, and a card that is clicked also belong to the New York Times™. In some exemplary embodiments, in case of non-organic transferring, in which the target publisher is different from the publisher of the first page, the browser may enable content rendering of the target publisher in to the iframe based on permissions of the target publisher, or based on any other parameter, heuristic, or the like.

In some exemplary embodiments, in some cases, the agent may identify one or more recommendation cards in the user's display that are predicted to be clicked by the user, and load content associated with one or more of these cards ahead of time, and possibly generate a potential target layout in memory, invisible in the background, or the like. In such cases, upon the user selecting a recommendation card that was predicted to be selected with content that was loaded ahead of time, the target content of the recommendation card may be rendered swiftly, without waiting for the content to be obtained, for DOM elements to be generated, or the like, thereby saving time and enhancing a UX of the user. In some exemplary embodiments, the predictions may be based on a history of user interactions of the user with the feed, based on a popularity of cards over a plurality of end devices, based on a profile of the user, or the like.

On Step 230, the iframe may be closed, removed, deleted, hidden, or the like, upon identifying an attempt of the user to return to the first page. In some exemplary embodiments, the user's attempt may comprise a "back" event invoked by clicking on a back button, selecting a Graphical UI (GUI) element configured to return the user to the first page, or the like. In some exemplary embodiments, the attempt of the user to return to the first page may be identified in any other manner, based on any type of selection of a 'back' control, based on vocal commands, or the like. In some exemplary embodiments, upon the user pressing a "back" element, the agent may remove the iframe from display in order to return the user to his previous display in the browsing experience (to return to consume content from the first page).

In some exemplary embodiments, the agent may be configured to determine an intention of the user invoking the "back" event. In some exemplary embodiments, the agent may estimate whether the user wishes to return to the same display of the first page, to a top of the first page (e.g., to consume the article), or the like. In some exemplary embodiments, in case the intent of the user is estimated to include returning to the same display of the first page from which the user selected the card, the iframe may be closed, refreshing of the first page may be blocked, or the like. In some exemplary embodiments, in case the intent of the user is estimated to include returning to a top of the first page, such as in order to consume the article above the feed, the iframe may be closed, refreshing of the first page may be initiated, or the like. For example, in case the user consumed the content of the card for a short period of time, in case the user is estimated to be of a user profile cluster that is more likely to prefer such user experience, or the like, the agent may estimate that the intention of the user is to return to the previous display and not to a top of the page, e.g., in order to obtain a seamless and continuous UX.

In some exemplary embodiments, the agent may simulate or suppress events and other UX-related behaviors of the browser. For example, the agent may send an analytics event indicating that the first page was loaded or refreshed, even though the first page was not loaded by the browser. In some exemplary embodiments, the agent may prevent or invoke refreshing or other events of the first page, of the second page, or the like.

On Step 240, the first page may be modified. In some cases, the page may be modified in view of the user interaction with the iframe. As an example, consider the case of a feed element with content cards. The interaction of Step 200 may be an interaction with a target content card (e.g., clicking the target content card). After returning to the first page after consuming the content associated with the target content card, a visual representation that the target content card was interacted with and that its associated content was consumed may be displayed, such as changing the colour of the target content card to grey, adding text indicating the user has consumed the content, or the like. As another example, a new content card may be added to the feed element. In some cases, in view of the interaction with the target content card, it may be decided to present another card that has a probability of being relevant to users who consumed the content of the selected content card. As an example, a new card may be added to the feed element below, above, near, or in another position in relation to the target content card. The new card may be designated in a distinguishing visual feature, indicating that the new card was recently added. As an example, the new card may be presented in a different colour, using a different border, using a different background colour, with a text note stating "you may also be interested in", or the like. In some cases, an animation may be utilized to show that the content card is being added to the page, to avoid confusing the user, and to provide a clear UX that provides in a clear visual manner, that the new card is currently being added to the feed in view of the user's previous interactions therewith. As yet another example, the page may be modified by introducing a visual guide element that is configured to assist the user in orienting in the page. The visual guide may hint to the user from where she had conceptually left the page before, indicate that she has returned to the same location as before, or the like. In some exemplary embodiments, the visual guide element may include an animation that is configured to direct the user's attention to a specific location.

Referring now to FIGS. 3A-3D, illustrating one or more exemplary scenarios, in accordance with some exemplary embodiments of the disclosed subject matter.

As shown in FIG. 3A, a user may browse a first page, e.g., Page 310, using a browser. A display of Page 310, such as Display 312, may comprise the portion of the page that is visible to the user at a certain moment. In some exemplary embodiments, the browser may load content in Page 310, including one or more content portions such as Content 315 and Content 317. For example, Content 315 may comprise an article that is obtained and loaded from a domain such as the news domain 'edition.cnn.com', while Content 317 may comprise a feed element that is obtained and loaded from one or more different or overlapping domains. In some exemplary embodiments, based on the scrolling of user in Page 310, the display may change as different areas of Page 310 may become visible without affecting the remaining content portions that are not visible at each point in time. In some exemplary embodiments, upon rendering Page 310, Display 312 of Page 310 may or may not initially depict a top of Content 315. As shown in FIG. 3A, Display 312 depicts Content 315.

As shown in FIG. 3B, in case the user scrolls down Page 310 to an area below Content 315, the Display 312 may comprise a different area of Page 310 that does not depict Content 315, e.g., an area of Page 310 depicting Content 317. In some exemplary embodiments, in some cases, Content 317 may comprise a feed including a plurality of recommendation cards (denoted r11 and r12) or any other types of cards, linked objects, or links that are associated with content. The feed of cards may be generated and populated by a third party, e.g., by a server that is not associated to the publisher of Page 310, by a publisher of at least some of the recommendation cards, or the like. For example, an advertising company such as TABOOLA™ may populate cards at a feed of a page associated with a GOOGLE™ publisher, that has a feed with recommendation cards that are populated by YAHOO!™. Alternatively, the feed may be generated and populated by one of the associated publishers, such as by a publisher of Page 310.

In some exemplary embodiments, after scrolling to Content 317 of Page 310, the user may select a recommendation card, e.g., r11, in order to view an associated content, e.g., Content 325. In some exemplary embodiments, in response to selecting the recommendation card, an event of navigating to a new content Page 320 may be invoked. In some exemplary embodiments, the event may comprise a browser event, a page event, or the like, instructing the browser to navigate to Page 320. In some exemplary embodiments, Content 325 may be linked or otherwise associated with the selected card, e.g., card r11, and may be configured to be rendered or served to the user upon selecting the respective recommendation card. In some exemplary embodiments, in response to invoking the event, the scenario of FIG. 3C may be implemented in case the default behavior of the browser is enabled, or, alternatively, the scenario of FIG. 3D may be implemented in case the default browser behavior is overridden.

In the scenario of FIG. 3C, a default behavior of the browser may be implemented. In some exemplary embodiments, the default behavior of the browser may comprise obtaining the event of selecting a card at the browser, and in response to the event, navigating from Page 310 to Page 320. In some exemplary embodiments, Content 325 may be configured to be loaded in Page 320 by publishers that may or may not be associated with the publisher of Page 310. For example, Content 325 may comprise content from the domain 'abcnews.go.com', which may be different from the publisher of Content 315, belonging to the domain 'edition-.cnn.com'. In other cases, the same publisher may be associated with both Content 315 and Content 325. For example, the domain 'edition.cnn.com' may provide Content 315, and Content 325 may be provided by the same domain 'edition-.cnn.com'.

In the scenario of FIG. 3D, instead of performing the default behavior of the browser, the agent may override the default browser behavior so that, upon the user selecting a card of Content 317 in FIG. 3B, the browser may not navigate to Page 320. For example, the agent may be configured to capture the event of selecting the card, without releasing the event to the browser. In some exemplary embodiments, the agent may be configured to monitor the events of Page 310, and upon obtaining an event of selecting a recommendation card, or any other linked portion of the page, the agent may capture the event, and instruct the browser to perform alternative operations in response. In some exemplary embodiments, as shown in FIG. 3D, instead of navigating to Page 320, the agent may render Content 325 within Page 310. In some exemplary embodiments, the agent may instruct the browser to launch or render an element, such as an iframe, within Page 310, and render Content 325 therein. For example, the agent may launch a new Display 322 depicting Content 325 over the Display 312 of Page 310, without navigating away from Page 310.

In some exemplary embodiments, in accordance with FIG. 3D, the agent may load an iframe on top of Display 312 of Page 310, and render Content 325 in the iframe. In some exemplary embodiments, the iframe may be generated, made visible, or the like, and the desired content may be presented therein. For example, the agent may render navigating from Page 310 to Page 320. As another example, the agent may render Page 320 in a separate invisible session, and present one or more portions thereof, imitations thereof, designs thereof, or the like, such as Content 325, in the iframe. In some exemplary embodiments, in case the user selects links within Content 325, the linked content may be rendered or presented by an additional iframe within the first iframe, e.g., iteratively. In some exemplary embodiments, all of the iframes may be rendered within Page 310.

In some exemplary embodiments, Display 322 may be placed on top of Display 312, hiding at least a portion of Display 312. In some exemplary embodiments, Display 322 may cover the entire Display 312, portions thereof, or the like. In some cases, Display 322 may be configured to have an identical appearance to Display 322 when being rendered in Page 320. For example, in both FIGS. 3C and 3D, Display 322 may comprise an identical user display, an identical visual layout, or the like. In other cases, Display 322 may appear differently in Page 310 and in Page 320. For example, Content 325 of FIG. 3D may be displayed on a smaller portion of Display 322 than Content 325 of FIG. 3C. In some exemplary embodiments, when showing Display 322 within Page 310, an address bar of Page 310 may be modified to indicate an address of Page 320, such as in order to fully imitate an UX of navigating to Page 320.

In some exemplary embodiments, after rendering or consuming Content 325, the user may attempt to return to the previous Display 312 in her user experience by pressing a "back" button, or instructing in any other way to return to the previous display. For example, the user may remember that card r12, which was not selected, seemed interesting, and may wish to consume content that is linked to card r12. In some exemplary embodiments, in the scenario of FIG. 3C, where Content 325 is rendered in a new page, in accordance with the browser default functionality, returning from Page 320 to Page 310 may comprise reloading Page 310, which may be time consuming, may provide a dull or bumpy user experience, may display to the user portions of Content 315 instead of Content 317, or the like. The browser may be configured by default to re-launch the previous Page 310, thereby utilizing unnecessary resources, and reducing a UX performance by requiring the user to scroll down again from a top of Page 310 to obtain the previous Content 317. In some exemplary embodiments, even in case the browser is enabled to automatically initiate a scroll down from Content 315 to Content 317, the display would "jump" down in a non-smooth way, providing a messy and jumpy user experience. Additionally, rendering Page 310 anew may cause analytics entities to count the visits to Page 310 inaccurately, as if the page was visited twice.

In some exemplary embodiments, these drawbacks may be overcome by implementing the scenario of FIG. 3D. In some exemplary embodiments, according to the current subject matter, the agent may override the 'back' functionality of Page 320 when rendered in the iframe, by merely closing the iframe, thereby returning to Content 317 in a smooth and non jumpy experience. In some exemplary embodiments, since Display 322 in FIG. 3D may be loaded within Page 310, the user's instruction may not be handled as a navigation operation by the browser. In some exemplary embodiments, the 'back' functionality or other navigation functionality of the browser may be overridden, altered, or the like, by the agent, so that upon obtaining an instruction to return to Page 310, the agent may obtain the instruction and close the iframe presenting Display 322, or otherwise stop Display 322 from being displayed. In some exemplary embodiments, in response to the user's instruction, the iframe may be closed, without providing an indication of the event to the browser. This may be in contrast to the browser default functionality, which may be configured to, in response to a 'back' event, navigate to a previous page.

In some exemplary embodiments, upon closing the iframe, the user may be provided with Display 312 showing the exact display area of Page 310 from which the user left, e.g., the display of Content 317, which remained under the iframe and may become visible again upon closing the iframe. Alternatively, based on an estimation that the user's intention was to view a different portion of Page 310, the agent may instruct the browser to refresh Page 310, causing Display 312 to move to a top of Page 310, e.g., to depict Content 315. For example, in case the user consumed Content 325 for a long period of time that overpasses a threshold, the user may be estimated to forget the other content cards of Content 317, and the user may be estimated to intend to consume Content 315, causing Page 310 to be determined to be refreshed.

In some exemplary embodiments, one or more properties of Content 317 may be altered upon returning to Content 317. For example, based on user consumption of Contents 315, 317, iframe displays, or the like, the feed of recommendations may be updated to personalize the recommendations cards. For example, in case the user scrolled down quickly when browsing Content 315, in a speed that indicates that the content was not fully consumed, the feed of recommendations may be updated to comprise cards with content that belongs to categories that are different from a category of Content 315.

In some exemplary embodiments, overriding the browser functionality may cause one or more browser operations associated with page navigation, not be performed. In some exemplary embodiments, implementing the disclosed subject matter may disrupt the default browser behavior such as by suppressing analytics events, e.g., since page navigation is not performed. In some exemplary embodiments, in order to complete one or more missing browser functionalities, the agent may initiate such operations instead of the browser. For example, reporting of page events to analytics servers may be initiated by the agent. In some cases, page events such as selecting cards of Content 317 and browsing their content within an iframe may be independently reported by the agent to analytics servers, e.g., through the browser. In some exemplary embodiments, based on the user interactions, card selection, or the like, one or more updates may be determined to be sent to third-party analytics services that count page views, signaling that Page 320 is visited, that Content 325 is consumed by a user, or the like, despite remaining in Page 310. In some exemplary embodiments, without such reporting, the count at the analytics servers may be wrong and inaccurate, at least since the Content 325 of the target publisher is browsed and consumed by the user, even if not in a formally new page from the point of view of a browser.

As another example, refreshing of Page 310 may be suppressed or invoked by the agent, instead of the default browser functionality. In some exemplary embodiments, the agent may simulate a desired browser behavior, such as by invoking an auto-refresh of the rendered Page 320 in iframe, by invoking an auto-refresh of Page 310 upon obtaining a 'back' command, or the like, thereby providing the user with a same UX as would be provided in case Display 322 was rendered on a new Page 320. As another example, in order to ensure that commands or events that are related to the browser's history mechanism are captured (e.g., invocation of a "back" event, a "popstate" event, or any other form of navigating between browser pages), the browser's history mechanism may be hacked by injecting an indication of Page 320 to the history log of the browser, e.g., although Page 320 is not officially navigated to. In some exemplary embodiments, this may enable the browser to identify that a new page was reached, even though the browser still renders the original Page 310. In some exemplary embodiments, in order not to miss a "popstate" event, DOM updates may be tracked.

Figure 4:
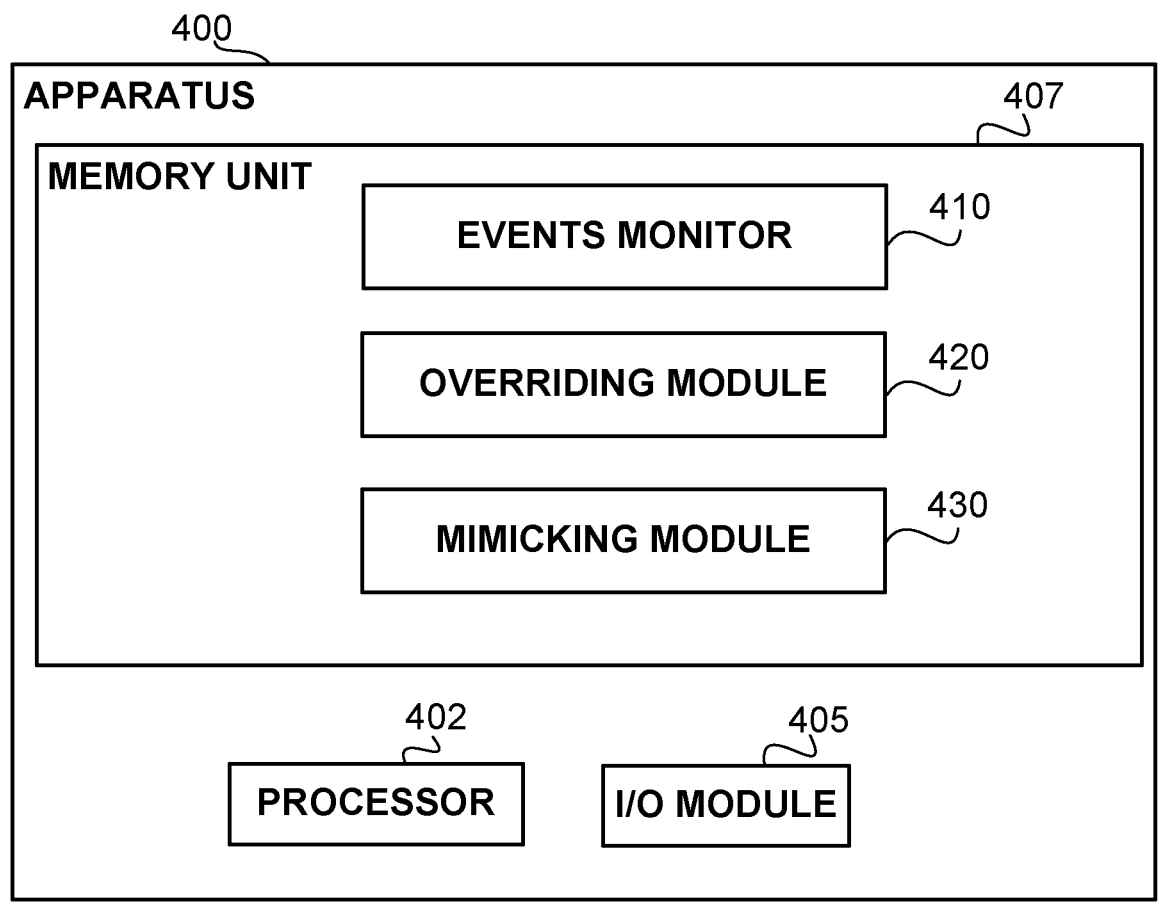
FIG. 4 shows an exemplary block diagram of an apparatus, in accordance with some exemplary embodiments of the disclosed subject matter.

Referring now to FIG. 4 showing a block diagram of an apparatus, in accordance with some exemplary embodiments of the disclosed subject matter.

In some exemplary embodiments, an Apparatus 400 may comprise a Processor 402. Processor 402 may be a Central Processing Unit (CPU), a microprocessor, an electronic circuit, an Integrated Circuit (IC) or the like. Processor 402 may be utilized to perform computations required by Apparatus 400 or any of its subcomponents. Processor 402 may be configured to execute computer-programs useful in performing the methods of FIGS. 1, 2, or the like.

In some exemplary embodiments of the disclosed subject matter, an Input/Output (I/O) Module 405 may be utilized to provide an output to and receive input from a user. I/O Module 405 may be used to transmit and receive information to and from the user or any other apparatus, e.g., a plurality of user devices, in communication therewith. For example, I/O Module 405 may be used to report events to analytics servers.

In some exemplary embodiments, Apparatus 400 may comprise a Memory Unit 407. Memory Unit 407 may be a short-term storage device or long-term storage device. Memory Unit 407 may be a persistent storage or volatile storage. Memory Unit 407 may be a disk drive, a Flash disk, a Random Access Memory (RAM), a memory chip, or the like. In some exemplary embodiments, Memory Unit 407 may retain program code operative to cause Processor 402 to perform acts associated with any of the subcomponents of Apparatus 400. In some exemplary embodiments, Memory Unit 407 may retain program code operative to cause Processor 402 to perform acts associated with any of the steps in FIGS. 1, 2, or the like.

The components detailed below may be implemented as one or more sets of interrelated computer instructions, executed for example by Processor 402 or by another processor. The components may be arranged as one or more executable files, dynamic libraries, static libraries, methods, functions, services, or the like, programmed in any programming language and under any computing environment.

In some exemplary embodiments, Events Monitor 410 may be configured to monitor one or more navigation events associated with a page rendered by a browser. In some exemplary embodiments, the navigation events may comprise one or more types of user interactions with the page, when attempting to navigate between pages. For example, Events Monitor 410 may be configured to monitor events of selecting a link to navigate to a different page, events of attempting to return to a previous page, or the like.

In some exemplary embodiments, Overriding Module 420 may be configured to capture events of interest from Events Monitor 410, and instruct a browser to implement an alternative functionality instead of the default browser behavior. For example, in case a user selected a link from a first page to a second page, Overriding Module 420 may launch an iframe within the first page and present content of the second page within the iframe.

In some exemplary embodiments, Mimicking Module 430 may be configured to mimic one or more default browser behaviors that are suppressed, such as by generating page count reports, changing a URL to the target page without navigating thereto, changing the history log of the browser, or the like. For example, upon rendering the second page in the iframe, Mimicking Module 430 may report to analytics servers that the second page was visited.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A browsable page retained in a non-transitory computer readable medium, wherein the browsable page comprising instructions for a browser executed on a computer device, wherein the browsable page comprising:
   a first webpage providing content to be displayed to a user, the first webpage is rendered by the browser, wherein the first webpage comprises a dynamically-loaded feed element, the first webpage comprises at least one content item different from the dynamically-loaded feed element, wherein the dynamically-loaded feed element is configured to dynamically load a set of content cards to be displayed in the dynamically-loaded feed element, wherein the dynamically-loaded feed element is an infinite feed element that is configured to load additional content cards in response to scrolling events, wherein the set of content cards are associated with links to pages, wherein the set of content cards comprise a card at a scrolled location of the first webpage that comprises a link to a second page, wherein reloading the first webpage at the scrolled location is configured to change the set of content cards and to change a displayed location of the first webpage from the scrolled location to a different location of the first webpage;
   wherein the browsable page is configured to cause the browser to, in response to a click on the card at the scrolled location, present content from the second page in an element that is placed over the first webpage, thereby preventing the user from seeing any portion of the first webpage, whereby providing a user experience of navigating away from the first webpage to the second page; and
   wherein the browsable page is configured to cause the browser to, after presenting the content from the second page and in response to a back instruction to the browser, cause the element not to be displayed, thereby providing a user experience of returning to the first webpage without reloading the first webpage, whereby returning to the scrolled location of the first webpage.

2. The browsable page of claim 1, wherein the browsable page is configured to cause the browser, in response to the back instruction, to dynamically modify the first webpage by at least one of:
   adding a content card to the dynamically-loaded feed element; and
   adding a visual guide element that is configured to assist the user in orienting in the first webpage.

3. The browsable page of claim 1, wherein the browsable page is configured to:
  estimate, prior to the click on the card, that the user will click on the card;
  prior to the click on the card and based on the estimation that the user will click on the card, load the content from the second page in the element in an invisible manner, wherein the second page is loaded in advance; and
  wherein the content from the second page is presented by causing the element to become visible.

4. A method comprising:
  displaying a content of a first webpage to a user, the first webpage is rendered by a browser, wherein the first webpage comprises a dynamically-loaded feed element, the first webpage comprises at least one content item different from the dynamically-loaded feed element, wherein the dynamically-loaded feed element is configured to dynamically load a set of content cards to be displayed in the dynamically-loaded feed element, wherein the dynamically-loaded feed element is an infinite feed element that is configured to load additional content cards in response to scrolling events, wherein the set of content cards are associated with links to pages, wherein the set of content cards comprise a card at a scrolled location of the first webpage that comprises a link to a second page, wherein reloading the first webpage at the scrolled location is configured to change the set of content cards and to change a displayed location of the first webpage from the scrolled location to a different location of the first webpage;
  in response to a click by the user on the card at the scrolled location, presenting content from the second page in an element that is placed over the first webpage, thereby preventing the user from seeing any portion of the first webpage, whereby providing a user experience of navigating away from the first webpage to the second page; and
  after presenting the content from the second page and in response to a back instruction by the user, causing the element to not be displayed, thereby providing a user experience of returning to the first webpage without reloading the first webpage, whereby presenting the scrolled location of the first webpage.

5. The method of claim 4, wherein the element is at least one of: an inline frame (iframe) element, and a container element, wherein said presenting the content from the second page comprises: presenting the content from the second page in the element as an overlay over the first webpage.

6. The method of claim 4, wherein said providing the user experience of navigation away from the first webpage to the second page comprises:
  monitoring events of the first webpage;
  capturing an event of interest, wherein the event of interest comprises an event indicating the click on the link; and
  stopping a propagation of the event of interest from reaching a navigation module of the browser.

7. The method of claim 4, wherein said providing the user experience of navigation away from the first webpage to the second page comprises: updating the first webpage to modify a behavior of the browser in response to the click, wherein said updating comprises including an instruction in the first webpage that is configured to cause the browser to present the content from the second page in the element, whereby performing said presenting the content from the second page in response to the click.

8. The method of claim 4, wherein the first webpage does not define the element, wherein the method comprises instructing the browser to add the element to the first webpage.

9. The method of claim 4, wherein the element is added to the first webpage by a server-side manipulation of the first webpage, whereby the element is added to the first webpage before the first webpage is served to the browser.

10. The method of claim 4 comprising modifying, in response to said presenting the content from the second page, an address bar of the browser to indicate an address of the second page, whereby providing a user experience of browsing to the second page without navigating to the second page.

11. The method of claim 4 comprising, in response to said presenting the content from the second page, generating an analytics event and sending the analytics event to an analytics entity, wherein the analytics event indicates that the user visited the second page, whereby enabling a correct server-side analysis of user activity consuming content of the first webpage and of the second page.

12. The method of claim 4 comprising modifying a history log of the browser, wherein said modifying comprises:
  in response to said presenting the content from the second page, adding to the history log an indication of the second page; and
  in response to said causing the element not to be displayed, adding to the history log an indication of the first webpage.

13. The method of claim 4, wherein the first webpage is a dynamic page comprising a dynamic element that receives updates after the first webpage is loaded, whereby returning to the first webpage is not configured to provide an identical display of the dynamic element of the first webpage as was displayed prior to presenting the content from the second page.

14. An apparatus comprising a processor and coupled memory, said processor being adapted to:
  displaying a content of a first webpage to a user, the first webpage is rendered by a browser, wherein the first webpage comprises a dynamically-loaded feed element, the first webpage comprises at least one content item different from the dynamically-loaded feed element, wherein the dynamically-loaded feed element is configured to dynamically load a set of content cards to be displayed in the dynamically-loaded feed element, wherein the dynamically-loaded feed element is an infinite feed element that is configured to load additional content cards in response to scrolling events, wherein the set of content cards are associated with links to pages, wherein the set of content cards comprise a card at a scrolled location of the first webpage that comprises a link to a second page, wherein reloading the first webpage at the scrolled location is configured to change the set of content cards and to change a displayed location of the first webpage from the scrolled location to a different location of the first webpage;
  in response to a click by the user on the card at the scrolled location, presenting content from the second page in an element that is placed over the first webpage, thereby preventing the user from seeing any portion of the first webpage, whereby providing a user experience of navigating away from the first webpage to the second page; and after presenting the content from the second page and in response to a back instruction by the user, causing the element to not be displayed, thereby providing a user experience of returning to the first webpage without reloading the first webpage, whereby presenting the scrolled location of the first webpage.

15. The apparatus of claim 14, wherein said providing the user experience of navigation away from the first webpage to the second page comprises:

monitoring events of the first webpage;

capturing an event of interest, wherein the event of interest comprises an event indicating the click on the link; and stopping a propagation of the event of interest from reaching a navigation module of the browser.

16. The apparatus of claim 14, wherein said providing the user experience of navigation away from the first webpage to the second page comprises: updating the first webpage to modify a behavior of the browser in response to the click, wherein said updating comprises including an instruction in the first webpage that is configured to cause the browser to present the content from the second page in the element, whereby performing said presenting the content from the second page in response to the click.

17. The apparatus of claim 14, wherein the first webpage does not define the element, wherein the processor is adapted to instruct the browser to add to the element to the first webpage.

18. The apparatus of claim 14, wherein the processor is configured to modify, in response to said presenting the content from the second page, an address bar of the browser to indicate an address of the second page, whereby providing a user experience of browsing to the second page without navigating to the second page.

19. The apparatus of claim 14, wherein the processor is configured, in response to said presenting the content from the second page, to generate an analytics event and send the analytics event to an analytics entity, wherein the analytics event indicates that the user visited the second page, whereby enabling a correct server-side analysis of user activity consuming content of the first webpage and of the second page.

20. The apparatus of claim 14, wherein the processor is configured to modify a history log of the browser, wherein said modifying comprises:

in response to said presenting the content from the second page, adding to the history log an indication of the second page; and in response to causing the element not to be displayed, adding to the history log an indication of the first webpage.

* * * * *